United States Patent [19]
Martuch et al.

[11] 3,820,271
[45] June 28, 1974

[54] FISHING LINE

[75] Inventors: Leon L. Martuch, Midland, Mich.; Bernard Kreh, Miami, Fla.

[73] Assignee: Scientific Anglers Inc., Midland, Mich.

[22] Filed: Apr. 19, 1972

[21] Appl. No.: 245,546

[52] U.S. Cl. ............................................ 43/44.98
[51] Int. Cl. ........................................... A01k 91/00
[58] Field of Search ................................. 43/44.98

[56] References Cited
UNITED STATES PATENTS

| | | | |
|---|---|---|---|
| 1,842,169 | 1/1932 | Heddon | 43/44.98 |
| 1,927,581 | 9/1933 | Bekeart | 43/44.98 X |
| 2,862,282 | 12/1958 | Beebe | 43/44.98 X |
| 3,453,769 | 7/1969 | Chandler | 43/44.98 |
| 3,653,143 | 4/1972 | Martuch | 43/44.98 |

*Primary Examiner*—Antonio F. Guida
*Assistant Examiner*—Daniel J. Leach
*Attorney, Agent, or Firm*—Laurence, Laurence & Neilan

[57] ABSTRACT

A reversible weight forward line having a weight forward section at each end of the line. Each weight forward section comprises a gradually-sloping forward taper of increasing diameter, a belly section of uniform diameter, and a short abruptly-sloping rear taper.

10 Claims, 4 Drawing Figures

FISHING LINE

This invention relates to an improved weight forward fly fishing line. This invention further relates to an improved weight forward fly fishing line having a weight forward section at each end of the line.

In fly fishing there are presently four basic types of lines being utilized; a level line, a double taper line, a weight forward line, and a shooting taper. For most purposes the level line or the double tapered line is utilized. These lines are also made as either floating or sinking lines, the particular selection being dependent upon the type and conditions of the fly fishing.

Where longer casts are required the weight forward or shooting taper lines are utilized. These lines require more experience in their use than the level or double tapered lines.

The presently available weight forward lines have just one weight section. The weight section consists of a tip, a forward taper, a level belly section and a rear taper. Following the weight section is a handling line and then the remaining line (running line) section. In this present commercial line, there is only one weight section, and this weight section is the point of wear, especially at the tip and at the junction of the weight section and the handling line. When the wear becomes excessive, the line must be discarded.

In addition the same weight forward line cannot or should not be utilized for all types of fishing. As an example, bass fishing and salt water fishing requires a different type of weight forward line than the usual fly fishing. In addition, the weights of the lines used are different for different fishing rods, also the line may be a floating or sinking type line.

With all these variables, which affect the effectivenss of the cast and/or utilization of the line, a fisherman is required to have in his possession several types of weight forward lines. This thus increases the amount of expense of the equipment a fisherman must own and carry with him.

It is thus an object of this invention to overcome the disadvantages enumerated above.

It is another object of this invention to provide a reversible weight forward fly line.

It is still another object of this invention to provide a reversible weight forward fly line having a weight forward section at each end of the line.

It is a further object of this invention to provide a reversible weight forward fly line in which both halves of the line are identical.

It is still another object of this invention to provide a reversible weight forward fly line in which both halves of the line are not identical.

Further objects, aspects, and advantages of the invention will be apparent from the description and drawings which follow.

Figure 1:
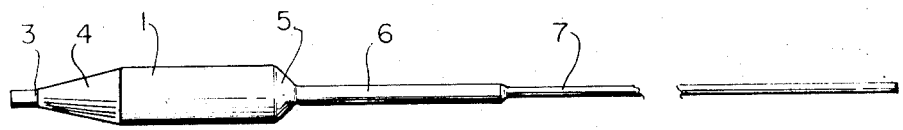
FIG. 1 is a longitudinal drawing of a conventional weight forward line.

A conventional weight forward line, as illustrated by FIG. 1, consists of a tip 3 of approximately 2 feet in length, a forward taper 4 between the belly section 1 and the tip 3. The forward taper is approximately 10 feet in length. The bulk of the section 1, is about 20 feet in length and then tapers 5 off over about a 2-foot length to the diameter of the handling line 6. The handling line 6 is about 17 feet in length and then is joined to the remaining length of line 7 running line, which is approximately 39 feet in length. The overall length of line is about 90 feet long with the section usually utilized in normal use — tip, forward taper, belly, rear taper and handling line — being about 51 feet in length.

In casting a conventional line, only the front section — that is the front about 50 feet — is utilized.

Figure 2:
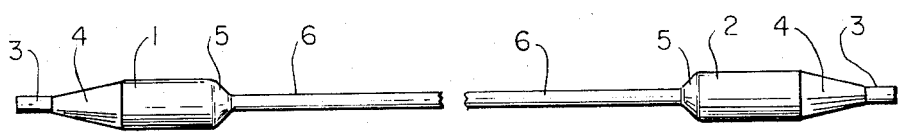
FIG. 2 is a longitudinal drawing of a reversible weight forward line in which both halves of the line are identical.

In a reversible weight forward line as illustrated by FIG. 2, a weight section appears at both ends of the line. The dimensions of the tip 3, forward taper 4, belly section 1, and rear taper 5, is the same at both ends and is comparable to the weight forward section of a conventional line. The handling section 6 connects to both weight sections instead of being connected to a weight section and another line section.

With the line of the present invention, instead of the handling line of about 17 feet and the remaining fly line of 39 feet, for a total of 56 feet, the center section (handling line) can be from 30 to 60 feet in length. This center section provides sufficient handling line for a good efficient cast. The actual length of the center section is dependent upon the constancy of the center section diameter, the similarities of the end sections — that is whether for a specialized use, and/or convenience in manufacture and use.

As was discussed previously, a cast with a weight forward line utilizes in most instances about 50 feet of the line which includes the tip, tapers, belly and handling line sections. A reversible line of the present invention which has a 30 foot center section still provides sufficient line for an efficient cast without having to utilize a running line as in a conventional line.

The reversible line of the present invention, having a uniform center section, thus provides significant advantages over the conventional line. The line being reversible, both ends can be utilized and therefore does not have to be discarded when one end is "worn."

Prolongation of the life of the line of the present invention due to reversibility of the two ends is not the only advantage offered by this invention. In varying the weight of each half of the line, two lines are available in one line. This would allow the fisherman to use two different rods of differing actions with the same line. In this embodiment, the end sections, tip 3, forward taper 4, belly 1, and rear taper 5 would be of different dimension from the lines previously discussed. The handling line center section of this embodiment is not uniform in diameter and/or weight. The handling line nearest the larger (heavier) weight-forward end would be larger in diameter than would the handling line nearest the smaller weight-forward end section. The transition between the two diameters and/or weights of center section handling line can be gradual if the difference between the two diameters or weights is great. The transition could be abrupt if the difference beteween the two is small.

If the difference between the two sections is small, especially in diameter, the change is small enough not to require a taper between the two sections. Where the difference is large, a taper is desired to provide a gradual change between the two sections. This gradual change eliminates stress points and is easier from a manufacturing viewpoint.

In the embodiment utilizing two different weights, the center section length is usually, but not necessarily, extended to ensure a sufficient casting length. Where there are two different weights usually one half of the center section is utilized in the cast whereas with a uniform center section essentially all of the center section can be utilized if desired.

Figure 3:
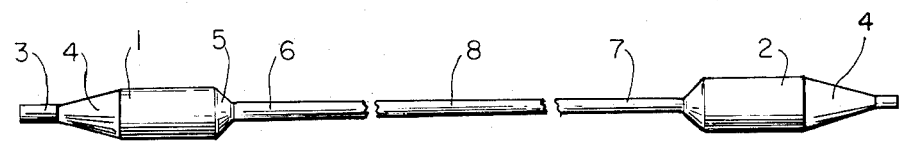
FIG. 3 is a longitudinal drawing of a reversible weight forward lines in which both halves of the line are not identical.

In FIG. 3 the center sections 6 and 7 are of different weights. In this particular illustration, a taper section 8 is shown between the two sections.

Figure 4:
FIG. 4 is a longitudinal drawing of a reversible weight forward line in which the diameter of the two ends is different.

In FIG. 4 the two end sections 1 and 2 are of different weights. In the illustration the difference in weight is due to end section 1 being of a greater diameter than end section 2.

Preparation of either reversible weight forward line utilizes conventional apparatus and methods.

Preparation may be by passing the line core through a coating bath and then through a variable orifice to produce the varying diameters of the line.

The production of a floating or sinking line may be by the incorporation of a foaming agent or additional weight to the coating or the addition of the foaming agent or additional weight to the open space within the core as disclosed in commonly owned applications Ser. No. 221,148 filed Jan. 27, 1972 and Ser. No. 221,149 filed Jan. 27, 1972, now abandoned, both applications being in the name of Leon L. Martuch.

In the production of a line according to this invention a core which may be nylon, dacron, silk or other suitable material is coated. The core material which provides the necessary tensile strength to the line usually has a braided configuration but may be twisted or the fibers may be laid side-by-side. The core material may also be a monofilament or filamentous in configuration. For purposes of this application the term "filamentous" will be utilized to include both forms.

The core material is essentially uniform in diameter and the tapering effect is due to the surface coating.

Conventional coatings known to the art may be utilized. The coating may be applied directly to the core material but preferably is applied over an intermediate primer.

The primer is preferably relatively non-viscous and is compatible with the surface coating plastisol. Suitable primers include, but are not limited to, vinyl chloride-vinyl acetate copolymers in methyl isobutyl ketone or acrylonitrile-butadiene copolymers in methyl ethyl or methyl isobutyl ketone.

The primer is applied to the core and the solvent evaporated prior to the application of the surface coating plastisol.

A conventional commercially available plastisol consists of a polymer usually vinyl chloride or vinyl chloride copolymer, and one or more plasticizers and stabilizers.

Stabilizers which may be utilized include, but are not limited to, lead, zinc and cadmium soaps, epoxides and the like. Stabilizers are normally added to the plastisol, especially vinyl chloride plastisols, to remove any hydrogen chloride formed and thus prevent deterioration of the surface coating.

Plasticizers for vinyl chloride polymers and copolymers include di-octyl adipate, di-2-ethylhexyl phthalate, dicapryl phthalate, tricresyl phosphate, trioctyl phosphate and the like. The plasticizer concentration in a plastisol is usually in the range of about 30 to 70 parts by weight of plasticizer per 100 parts by weight of the polymeric component.

A typical plastisol formulation in parts by weight is a follows:

| | |
|---|---|
| polyvinyl chloride (Geon 121) | 100 |
| dioctyl adipate | 53 |
| epoxidized tall oil (Flexol EP8) | 10 |
| lead soap | 3 |

In applying the coating, the line is passed through a bath containing the plastisol at a rate which will ensure the adherence to the line of the approximate thickness of coating desired. After passing through the plastisol, the coated line passes between grooved wheels or a variable orifice which tapers the coating, removing the excess coating. The tapered line is then heat treated to cure the plastisol.

A particulate material may be added to the surface coating plastisol to increase the weight of the coating thus requiring a thinner coating and a resultant smaller diameter line. Coating formulation containing particulate material may be found in the prior art such as U.S. Pat. NO. 3,486,266.

The preferred embodiment of the present invention has equal weight on each half of the line. In the preparation of this line only one plastisol need be utilized and the rate in which the line is passed through the plastisol bath is relatively constant.

If the two halves are of different weights the plastisol may be changed after half the line has passed through the bath or particulate material added to the plastisol. The particulate material may be added to either form a sinking or floating line. Particulate material for each use is known in the art.

Another means for incorporating a variable weight to the lines is illustrated in said applications Ser. Nos. 221,148 and 221,149, filed Jan. 27, 1972 and Jan. 27, 1972, respectively, and they are incorporated into this application by reference.

The center of the core material is an open space. In said applications the open space is filled with a foamed or formable material or a thread incorporating a weight material. The core line is usually braided around the material filling the open space. The core is then coated according to conventional means. This method offers the advantage that the surface coating thickness is uniform even though the weight of the two halves may be different.

It is thus apparent that utilizing the present invention's various types of reversible weight forward lines are possible and practical. These lines include lines in which the two-end sections are of equal weight and have the same taper and are the same type; the two ends have the same weight and the same taper but are different types of weight forward lines; the two ends have the same weight and are the same type of weight forward lines but have different tapers. Lines are also possible in which the two ends are of different weights and are the same type of weight forward lines but in which the taper may be the same or different.

It is apparent that other combinations of reversible weight forward lines are possible.

The reference to weight refers to the standard AFTMA method of measurement; taper refers to the front taper and the length of the taper; and type refers to whether it is a floating or sinking line.

Utilizing the methods of preparation disclosed herein, it is possible to vary the weight of the two halves of the line or the ends of the lines and even to mix a floating and sinking line. The last cited line would require an expertise in fly casting in order to efficiently use the line. The rate of application and calculation of the amount of particulate material, if any, dispersed in the plastisol is within the knowledge of those skilled in this art.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. A reversible weight forward line comprising a weight forward section at each end of a handling line, each said weight forward section consisting of a short tip, a forward taper of substantially longer length than said tip, a section and a short rear taper.

2. A reversible weight forward line in accordance with claim 1 in which each weight forward section is essentially the same weight.

3. A reversible weight forward line in accordance with claim 2 in which said handling line is essentially uniform in weight.

4. A reversible weight forward line in accordance with claim 2 in which said handling line is a floating line.

5. A reversible weight forward line in accordance with claim 1 in which each said weight forward section is of different weight.

6. A reversible weight forward line in accordance with claim 5 in which said handling line is not essentially uniform in diameter.

7. A reversible weight forward line in accordance with claim 1, in which said belly section has a diameter greater than that of said handling line and a length greater than that of said forward taper.

8. A reversible weight forward line in accordance with claim 7, wherein each tip has a length of about 2 feet.

9. A reversible weight forward line in accordance with claim 1, in which each forward taper has a length of about 10 feet, each belly section has a length of about 20 feet, and said handling line has a length of about 30–60 feet.

10. A reversible weight forward line in accordance with claim 9, in which each tip and each rear taper has a lengh of about 2 feet.

* * * * *